Sept. 11, 1956     A. G. BADE     2,762,232
SPEED REDUCER

Filed June 16, 1952     3 Sheets-Sheet 1

INVENTOR.
Alfred G. Bade
BY
ATTORNEY

Sept. 11, 1956     A. G. BADE     2,762,232
SPEED REDUCER
Filed June 16, 1952     3 Sheets-Sheet 2
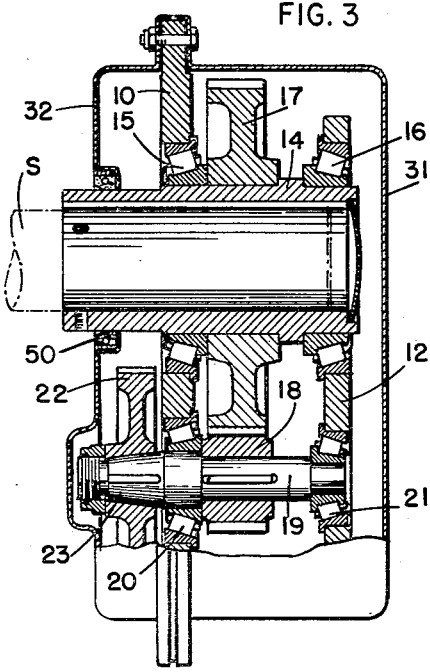
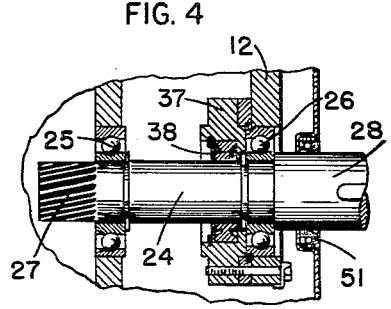
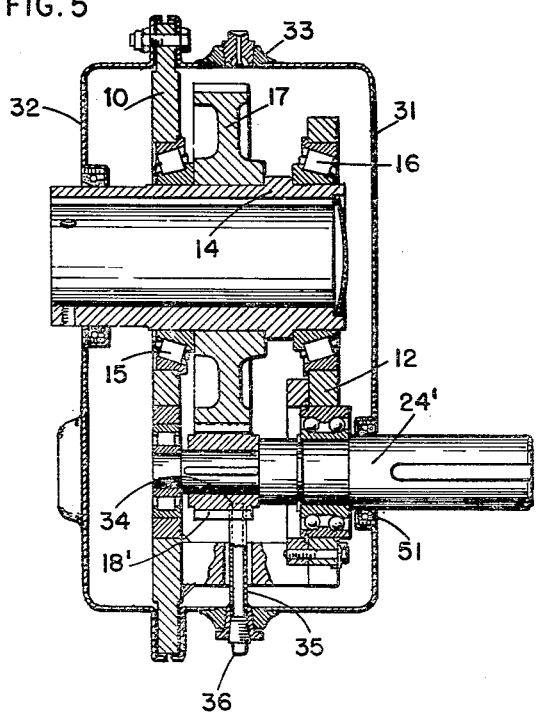
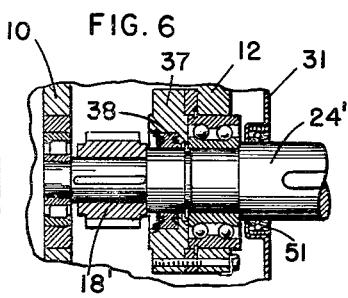
INVENTOR.
Alfred G. Bade
BY
ATTORNEY Sept. 11, 1956     A. G. BADE     2,762,232

SPEED REDUCER

Filed June 16, 1952     3 Sheets-Sheet 3

INVENTOR.
Alfred G. Bade
BY
ATTORNEY

United States Patent Office 2,762,232
Patented Sept. 11, 1956

2,762,232

SPEED REDUCER

Alfred G. Bade, Milwaukee, Wis., assignor to The Falk Corporation, Milwaukee, Wis., a corporation of Wisconsin Application June 16, 1952, Serial No. 293,793

5 Claims. (Cl. 74—421)

This invention relates to speed reducers of the so-called torque arm type.

Speed reducers of this type are commonly designed for direct mounting on the mechanism to be driven and are ordinarily equipped with a power output shaft of hollow form adapted to receive an end of the input shaft of the driven mechanism to drive the same and to derive support therefrom. The output shaft is usually journalled in a suitable oil retainer housing that encloses and supports a set of gears through which the output shaft is driven, ordinarily at reduced speed, from an input shaft also journalled in the housing.

In devices of this kind it is necessary to hold the housing against rotating under the rather heavy torque reaction imposed thereon by the gear load, this being accomplished usually by anchoring the housing to a fixed part of the driven mechanism through suitable linkage or the like. As heretofore designed, however, the gear load and the housing anchorage are commonly so related that undesirable stresses are set up tending to objectionably disturb and distort the housing in a manner to impair its oil retaining function and to adversely affect the meshing relation between gears.

One object of the present invention is to provide an improved speed reducer of the type mentioned so constructed as to avoid the objectionable stresses above noted.

Another object is to provide a speed reducer of the type mentioned of exceptionally high torque transmitting capacity within a minimum space.

Another object is to provide a speed reducer constructed to facilitate assembly of the gears and shafts therein.

Another object is to provide a speed reducer which will afford ready inspection of the operating parts for accuracy and wear.

Another object is to provide an improved speed reducer of the type mentioned that may be economically fabricated of steel.

Other more specific objects and advantages will appear, expressed or implied, from the following description of illustrative embodiments of the invention.

In the accompanying drawings:

Fig. 3 is a sectional view taken substantially along the line 3—3 of Fig. 1.

Fig. 4 is a fragmentary sectional view showing a back stop applied to the input shaft.

Fig. 5 is a vertical sectional view with the gears arranged for a single stage of speed reduction.

Fig. 6 is a view similar to Fig. 4 showing a back stop applied to the input shaft of Fig. 5.

Figure 2:
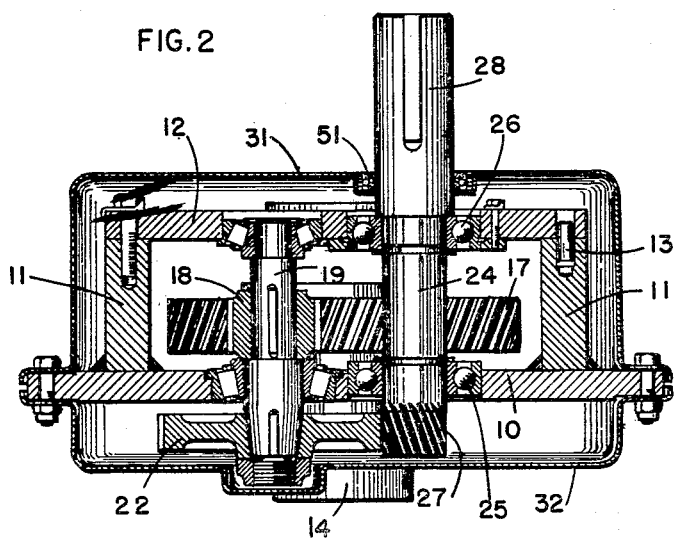
Fig. 2 is a sectional view taken substantially along the line 2—2 of Fig. 1.
Figure 1:
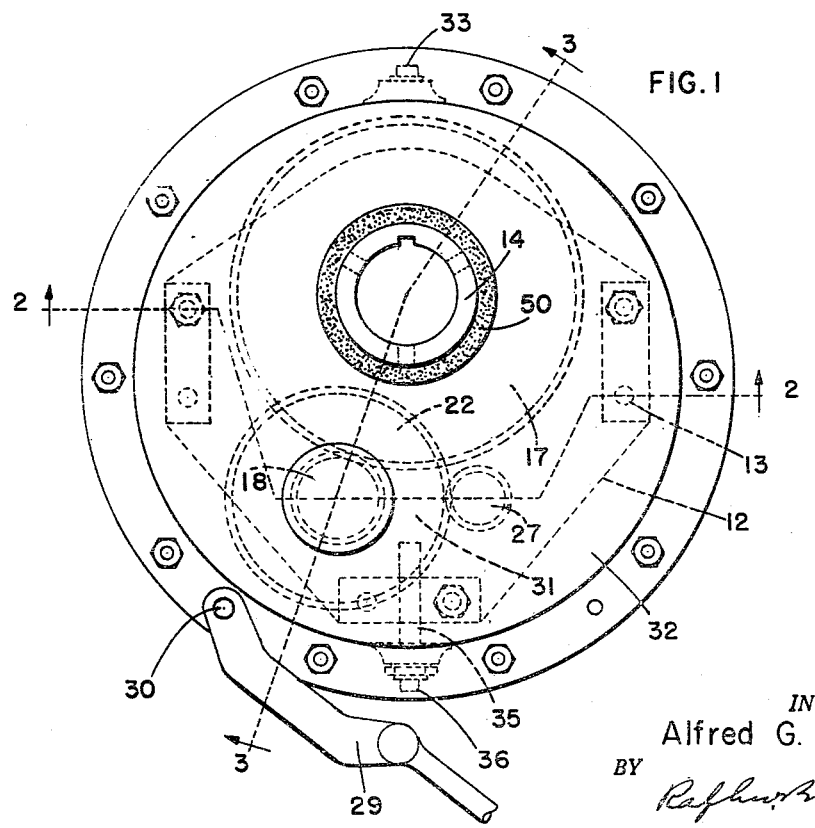
Figure 1 is a view in front elevation of a speed reducer constructed in accordance with the present invention.

Each of the several speed reducers shown includes a plurality of parallel shafts journalled in a rigid open frame and interconnected by a speed reduction gear set carried thereby, each of the shafts being accurately positioned by a pair of bearings well spaced axially thereof and securely fixed in the frame. In each instance the frame shown includes a main support member preferably comprising a rather heavy steel plate and an auxiliary support member also preferably comprising a rather heavy steel plate rigidly secured to and carried by the main support member and spaced laterally therefrom.

In the speed reducer illustrated in Figs. 1 to 4 the main support member, shown at 10, is in the form of a disk having a set of spaced lugs 11 welded to and projecting from one face thereof, and the auxiliary support member 12 comprises a plate of irregular contour seated on the outer end faces of the lugs 11 and bolted or otherwise releasably attached thereto. Dowels 13 insure an accurate positional relation between the members 10 and 12.

One of the plurality of shafts hereinabove mentioned comprises a power output shaft 14 preferably of hollow form to receive the end of the input shaft S of the mechanism to be driven, the shaft 14 being adapted to be keyed or otherwise attached to the shaft S to drive the same. The shaft 14 is journalled in appropriate bearings 15 and 16 securely fixed in the frame members 10 and 12, respectively. It will of course be understood that when the shaft 14 is applied to shaft S, the latter provides support for the shaft 14 as well as the frame members 10 and 12.

The shaft 14 is driven by a gear 17 fixed thereto between the frame members 10 and 12 and preferably as close as possible to member 10, so that the load imposed by the gear 17 is sustained largely by the member 10. It will be noted that in this instance the gear 17 is shown seated against the inner race of the bearing 15 and spaced from the other bearing 16. The gear 17 meshes with and is driven by a small gear or pinion 18 fixed to a second shaft 19, also arranged as close as possible to the member 10.

The shaft 19 is journalled in axially spaced bearings 20 and 21 respectively fixed in the members 10 and 12. Shaft 19 extends through the member 10 and carries a gear 22 detachably fixed to the projecting tapered end 23 thereof. It will be noted that the gear 22 is also immediately adjacent the member 10.

A third shaft 24 comprising a power input shaft is journalled in axially spaced bearings 25 and 26 respectively fixed in the members 10 and 12. Shaft 24 extends through and beyond both members 10 and 12, one projecting end thereof having a small gear or pinion 27 formed thereon and meshing with the gear 22, the other projecting end 28 thereof being fashioned to receive a suitable driving element such as a pulley or the like (not shown).

The several gears 27, 22, 18 and 17 coact to provide a torque-transmitting gear set through which the output shaft 14 is driven at reduced speed from the input shaft 24 and, arranged in the manner above described, this gear set straddles the main support member 10 immediately adjacent the same so that the loads imposed on the several gears are sustained largely by said member.

It will of course be understood that the reaction between these gears imposes a torque on the member 10 tending to rotate the same about the axis of shaft 14. In the transmission shown this torque is sustained by a suitable stationary link 29 directly attached, as at 30, to the main support member 10 and disposed substantially in the plane of said member, so as to hold the same against rotation without setting up in the frame, of which the member 10 forms a part, any stresses tending to twist or distort the same.

The gearing is enclosed in an appropriate oil retainer housing which in the reducer shown comprises a cover 31 bolted or otherwise attached to one face of the main supporting member 10 and shaped to house the auxiliary support 12 and the gears 17 and 18. A second cover 32 similarly applied to the other face of the member 10 encloses the gears 22 and 27.

The rotating parts of the speed reducer shown are splash lubricated from a bath of oil maintained in the bottom of the housing, oil being admitted thereto through a plug-controlled fitting 33 welded or otherwise attached to the housing member 31 at a high point thereof. The level of oil in the housing is determined by the upper end 34 of an outlet pipe 35 mounted in upright position in the bottom of the housing member 31. The pipe is normally closed by a suitable plug 36. When supplying or adding oil to the housing, the plug 36 is removed until the oil bath reaches a level corresponding to the upper end 34 of the pipe and starts discharging through the pipe, whereupon the pipe is closed by applying the plug thereto. With the pipe 35 thus arranged, it is capable of determining the proper oil level with a fair degree of accuracy even though the speed reducer be somewhat tilted in one direction or another from the vertical position shown in Fig. 1.

In some industrial applications it is highly desirable in a speed reducer of this type to provide means for preventing reverse operation thereof. In this instance this is accomplished by applying to the shaft 24 a so-called back stop mechanism such as indicated in Fig. 4. The back stop mechanism therein shown comprises a one-way brake including a brake ring 37 disposed concentrically of the shaft 24 and bolted or otherwise fixed to the auxiliary support member 12. A circular series of cam shaped sprags 38 are loosely confined between the ring 37 and shaft 24 and yieldably retained in light contact with both in a well known manner. The arrangement is such that the shaft 24 is free to rotate in one direction, but upon attempted rotation thereof in a reverse direction the several sprags tilt into wedging engagement with the ring 37 and shaft 24 to instantly lock the latter against such reverse rotation. Since the construction and operation of sprag type clutches and brakes are well known in the art, further description of the one-way brake shown is deemed unnecessary.

The speed reducer shown in Figs. 5 and 6 is identical with that hereinabove described except that the second or intermediate shaft 19 with its gears 18 and 22 have been eliminated and the input shaft 24 has been replaced by an input shaft 24' having a small gear or pinion 18' thereon positioned to mesh with and to drive the low speed gear 17. The device of Fig. 5 thus provides a single stage of speed reduction between the input and output shafts 24' and 14 instead of the double stage reduction provided in the device first described.

Figure 7:
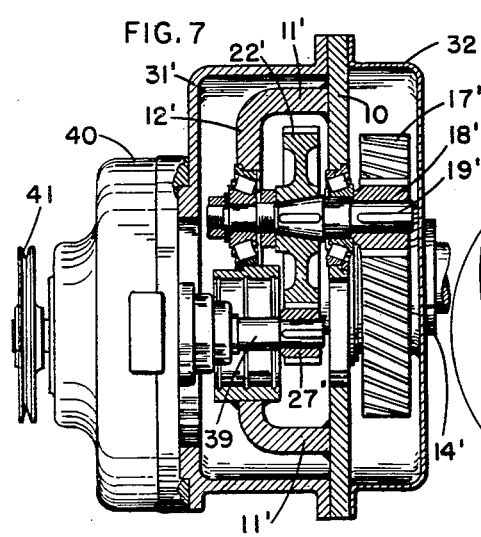
Fig. 7 is a sectional view taken substantially along the line 7—7 of Fig. 8 illustrating a modified form of speed reducer equipped with a driving motor.
Figure 8:
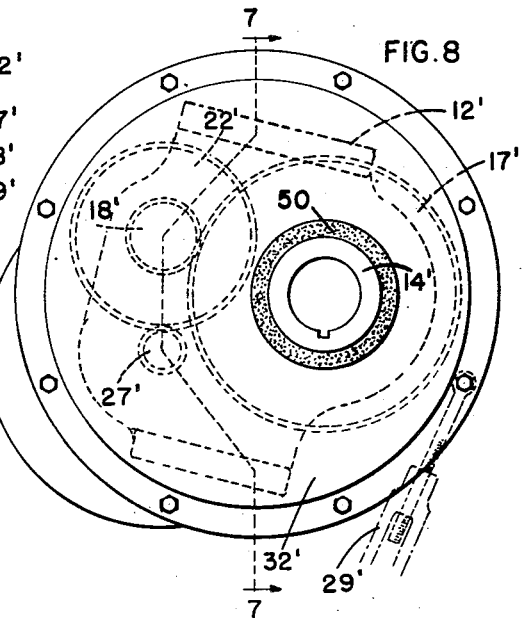
Fig. 8 is a view in elevation of the speed reducer shown in Fig. 7.

The speed reducer shown in Figs. 7 and 8 is also quite similar to that shown in Figs. 1 to 4 in that the shaft-supporting frame includes a main support member in the form of a disk 10 and an auxiliary support member in the form of an irregular shaped plate 12' carried by and spaced from the disk 10. In this instance however the plate 12' is welded or otherwise permanently attached to the disk 10 through laterally deflected portions 11' constituting integral parts of the plate 12'. In this instance also the hollow output shaft 14' is journalled in both members 10 and 12' in much the same manner as in the device of Figs. 1 to 4 and the shaft 14' is driven by a gear 17' fixed thereto adjacent the member 10 but on that side of the member 10 opposite the member 12'. Also an intermediate shaft 19' is provided journalled in both members 10 and 12' and equipped with a small gear or pinion 18', meshing with the gear 17', and a larger gear 22' disposed between the members 10 and 12' and meshing with a small driving gear or pinion 27'.

In this instance the pinion 27' is carried by the armature shaft 39 of a suitable electric motor 40. An axial gap type of motor of well known construction is preferably employed because of the highly desirable axial compactness thereof, as illustrated. The motor 40 is shown seated on and attached to a housing member 31' attached to the main support member 10 in much the same manner as previously described. A second housing member 32' attached to the opposite face of the member 10 completes the housing.

A suitable anchor link 29' directly attached to the main support member 10 holds the same against rotating.

A pulley 41 or the like attached to the outer end of the motor armature shaft provides a convenient means through which the motor may be utilized to drive auxiliary equipment.

Figure 9:
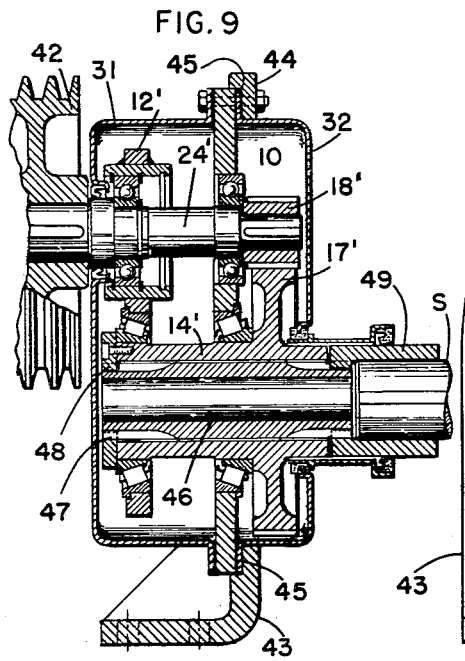
Fig. 9 is a sectional view taken substantially along the line 9—9 of Fig. 10 illustrating another modification of the present invention.
Figure 10:
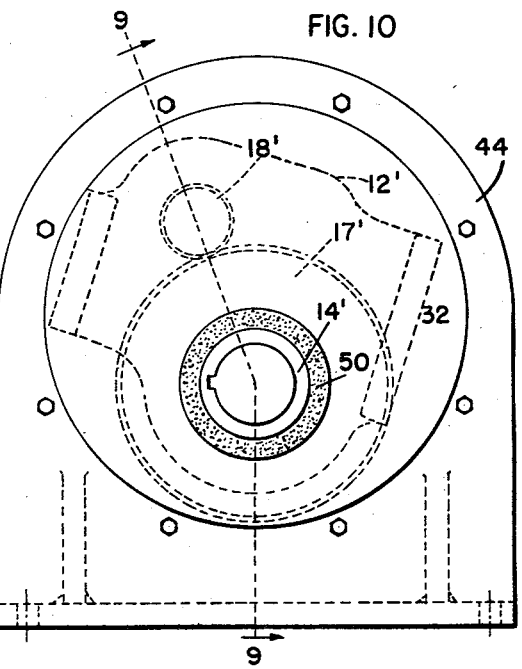
Fig. 10 is a view in elevation of the speed reducer shown in Fig. 9.

The speed reducer shown in Figs. 9 and 10 includes a frame substantially identical with that shown in Figs. 7 and 8 comprising a main support member in the form of a disk 10 and an auxiliary support member in the form of a plate 12' permanently attached to the member 10 in the manner previously described. It also includes a power output shaft 14' of hollow form journalled in both frame members 10 and 12' and carrying a gear 17' through which it is driven. In this instance the gear 17' meshes with a small driving gear or pinion 18' attached to the projecting end of a power input shaft 24' also journalled in both members 10 and 12' and shown equipped with a driving pulley 42.

In the speed reducer of Figs. 9 and 10 provision is made for rigidly mounting the same independently of the shaft S of the driven mechanism and also for providing a flexible driving connection between it and the shaft S, so that it is unaffected by any eccentricity or misalignment of the latter. In this instance a suitable mounting bracket 43 is provided having an upright portion 44 shaped to receive and encircle the speed reducer and to provide a circular seat 45 for the peripheral portion of the support member 10 thereof, the latter being shown bolted or otherwise attached to the seat.

The above mentioned flexible driving connection shown includes a tubular member 46 extending loosely substantially through the hollow shaft 14' and having teeth 47 formed at one end thereof loosely engaged with an internally toothed coupling ring 48 attached to the inner end of the shaft. The opposite end of the member 46 is in similar toothed engagement with a coupling sleeve 49 keyed or otherwise attached to the shaft S. The member 46 is free to float within the shaft 14' and that condition together with the flexible toothed connections between that member and the coupling ring 48 and coupling sleeve 49 results in a driving connection having ample flexibility to accommodate any departure from true alignment between the shafts S and 14'.

As in the other speed reducers hereinbefore described the two housing members 31 and 32, attached to opposite faces of the member 10, provide a lubricant container in which the described gearing is enclosed. It will be noted that with the lubricant retainer housing thus arranged the shafts and gears are assembled and mounted quite independently of the housing, that the housing remains unaffected by the torque loads imposed by the gears and shafting or by the anchor link 29, and that either or both of the housing sections 31 or 32 may be removed without affecting the operability of the gears and shafting, thereby permitting inspection of any of the rotating parts even during operation thereof.

Moreover, leakage of lubricant from the housing is effectively prevented by the use of simple seals, such as shown at 50 and 51. These seals are both carried by the housing and spaced from the adjacent shaft bearings where they are uninfluenced by the oil pumping action characteristic of such bearings, any oil passing through the bearings being free to escape into the housing before reaching the seals.

Various changes may be made in any of the embodiments of the invention hereinabove specifically described without departing from or sacrificing the advantages of the invention as defined in the appended claims.

I claim:

1. A speed reducer adapted for mounting on the drive shaft of a machine driven thereby, said speed reducer comprising an open frame having a pair of laterally spaced rigidly interconnected members, an encircling lubricant retainer housing attached to said frame to form a closure therefor, a plurality of shafts each journalled in both of said frame members, gearing interconnecting said shafts, one of said shafts comprising an input shaft projecting through a wall of said housing, another of said shafts comprising an output shaft having a hollow portion extending through said frame members and adapted to receive the machine drive shaft in supporting and driving relation therewith, and linkage means attached to one of said frame members for sustaining said frame against rotation about the machine drive shaft.

2. A speed reducer adapted for mounting on the drive shaft of a machine to be driven thereby, said speed reducer comprising an open frame having a pair of laterally spaced rigidly interconnected substantially parallel members, one of said members being extended beyond the periphery of the other of said members, a lubricant retainer housing enclosing said frame, said housing comprising separable parts both attached to said extended frame member, a plurality of shafts each journalled in both of said frame members, gearing connecting said shafts in driving relation, one of said shafts comprising an input shaft projecting through a wall of said housing, another of said shafts comprising an output shaft having a hollow portion extending through said frame members and adapted to receive the machine drive shaft in supporting and driving relation therewith, and means attached to said extended frame member for sustaining said frame against rotation.

3. In a speed reducer the combination of an open frame having a pair of spaced rigidly interconnected members, a plurality of shafts each journalled in both of said members, gears connecting said shafts, said shafts including an input shaft and a hollow output shaft both projecting from said frame, a lubricant retainer housing attached to and enclosing said frame, said housing including wall portions spaced from said frame and having openings therein through which said input and output shafts project, sealing means for said openings, and means attached to said frame for sustaining the same against rotation.

4. In a speed reducer the combination of an open frame, having a pair of spaced substantially parallel rigidly interconnected members, an input shaft journalled in and projecting beyond both of said members, a gear fixed on one projecting end of said shaft, a second shaft journalled in both of said frame members, a gear fixed on said second shaft and meshing with said pinion, a hollow output shaft journalled in both of said frame members, gears between said frame members and operably connecting said second shaft to said output shaft, a lubricant retainer housing carried by said frame and enclosing all of said gears, and means attached to said frame for sustaining the same against rotation.

5. In a speed reducer the combination of a frame having a pair of spaced rigidly interconnected members, a plurality of shafts each journalled in both of frame members and including an input shaft and a hollow output shaft, gearing connecting said shafts, a one-way brake attached to one of said frame members and coacting with said input shaft to prevent rotation thereof except in one direction, means attached to said frame to sustain the same against rotation, and a lubricant retainer housing attached to and enclosing said frame.

References Cited in the file of this patent

UNITED STATES PATENTS

| | | |
|---|---|---|
| 993,570 | Webster | May 30, 1911 |
| 1,164,419 | Smith | Dec. 14, 1915 |
| 1,220,811 | Alquist | Mar. 27, 1917 |
| 1,874,905 | Coffey | Aug. 30, 1932 |
| 2,116,166 | Christian | May 30, 1938 |
| 2,257,747 | Jones | Oct. 7, 1941 |
| 2,578,316 | Pealer | Dec. 11, 1951 |
| 2,578,446 | O'Daniel | Dec. 11, 1951 |
| 2,583,751 | Schmitter | Jan. 28, 1952 |
| 2,596,794 | Schmitter | May 13, 1952 |
| 2,600,697 | Schmitter | June 17, 1952 |
| 2,606,453 | Firth | Aug. 12, 1952 |